United States Patent [19]

Dahmen et al.

[11] Patent Number: 4,579,273

[45] Date of Patent: Apr. 1, 1986

[54] WELDED PIPE CONNECTION

[75] Inventors: Karl Dahmen, Hamm; Heinz Gross, Dortmund; Martin Henning, Hamm, all of Fed. Rep. of Germany

[73] Assignee: Hoesch Werke AG, Dortmund, Fed. Rep. of Germany

[21] Appl. No.: 343,360

[22] Filed: Jan. 27, 1982

[30] Foreign Application Priority Data

Oct. 23, 1981 [DE] Fed. Rep. of Germany ....... 3142073

[51] Int. Cl.[4] ............................................... B23K 5/22
[52] U.S. Cl. .................................... 228/102; 228/212; 228/49.3; 285/286
[58] Field of Search ............... 285/286, 184, 261, 286, 285/49.3; 228/29, 49 B, 119, 44.5, 102, 212

[56] References Cited

U.S. PATENT DOCUMENTS

| | | | |
|---|---|---|---|
| 1,816,770 | 7/1931 | Gradl | 285/286 X |
| 1,908,020 | 5/1933 | Hulsart | 285/286 X |
| 1,989,614 | 1/1935 | Halpern et al. | 285/286 X |
| 2,795,689 | 6/1957 | McNutt | 285/286 |
| 2,862,729 | 12/1958 | Bredtschneider | 285/286 X |
| 3,207,408 | 9/1965 | Thome et al. | 228/29 |
| 3,979,041 | 9/1976 | Kaneyama | 228/44.5 X |

FOREIGN PATENT DOCUMENTS

| | | | |
|---|---|---|---|
| 858162 | 12/1952 | Fed. Rep. of Germany | 285/286 |
| 966298 | 7/1957 | Fed. Rep. of Germany | 285/286 |
| 1022061 | 1/1958 | Fed. Rep. of Germany | 285/286 |
| 48205 | 11/1937 | France | 285/286 |
| 394736 | 12/1965 | Switzerland | 285/286 |

*Primary Examiner*—Dave W. Arola
*Attorney, Agent, or Firm*—Horst M. Kasper

[57] ABSTRACT

A method is provided for joining the ends of steel pipes having male and female ends. The pipe is inserted with the male end into the pipe with the female end and a circular seam is welded, which is disposed at the inside of the female pipe for solidly connecting the pipe with the male end to the pipe with the female end. The male end is preferably provided with a ball section and the female end correspondingly with a ball shaped socket for allowing the pipe to be angled at the connection points. The invention provides the advantage that in automatic welding no large head holes have to be dug out.

5 Claims, 4 Drawing Figures

WELDED PIPE CONNECTION

BACKGROUND OF THE INVENTION

1. Field of the Invention

The present invention relates to a method for producing and to a welded pipe connection.

2. Brief Description of the Background of the Invention Including Prior Art

In addition to butt welding connections also socket type welding connections with straight or ball type sockets are employed in steel pipe line construction. Such connections are specified for example in German Industrial Standard DIN 2461. These welded socket connections have as a connecting seam a circumferential fillet welding seam welded from the outside of the pipes.

Steel pipes with such connections can be easily, rapidly and simple laid and welded. Upon employing of welding ball sockets expensive bending of the pipes at the construction site can be avoided. In case of pipes with diameters larger than 2 meters the present day bending apparatus are not capable of providing such a bent pipe.

In the laying of pipe into the ground and in particular with socket pipes of a larger diameter, the outer welding seam between female socket and male end is performed in the trench for the pipe. This requires the digging of the so-called head holes in order to provide sufficient work area for the welding operation. These holes have to be particularly large in cases where the welding seam is to be provided by an automatic welder. For example in case of pipes having a diameter of three meter thus head holes result having a cross-section of more than 20 meters squared. This is an unbearably high expense, which has to be repeated every 6 to 25 meters of length of pipe depending on the lengths of the pipes employed.

In addition, centering devices are known which aid in butt welding of pipes to a pipe line on construction sites as is taught for example in U.S. Pat. No. 3,979,041.

SUMMARY OF THE INVENTION

Purposes of the Invention

It is an object of the present invention to provide a welded connection for steel pipes, which gives the advantages of a welded socket joint and which simultaneously reduces the technical requirements to a minimum level.

It is a further object of the present invention to provide a method for the joining of pipes which is suitable for large pipe lines.

It is still another object of the invention to provide for constructing pipelines without requiring the digging of so-called large head holes.

These and other objects and advantages of the present invention will become evident for the description which follows.

Brief Description of the Invention

The present invention provides a method for the joining of the ends of steel pipes having male and female ends. The pipe with the male end is inserted into the pipe of the female end and a circular seam disposed at the inside of the female pipe and at the rim of the male pipe is welded for solidly connecting the pipe with the male end to the pipe with the female end. The male end can be provided by a straight section and the female end can be provided by a larger diameter straight section for resulting in a socket type connection. Alternatively, the male end can be provided with a ball section and the female end can be provided with a ball type socket. The male end can be centered into the female end before beginning with the welding. Preferably, the centering and/or the welding are performed automatically.

A welded pipe connection results which comprises a female pipe end of a first pipe having inserted the male end of a second pipe and an inner welding seam disposed at the rim of the male pipe end and solidly connected to the inside of the female pipe. Preferably the pipe is a steel pipe. In one aspect, the male end can be formed as a ball section and the female end can be formed as a ball socket. Alternatively, the male end can be provided by a straight section and the female end can be provided by a larger diameter straight section for providing a socket type connection.

In another aspect of the invention the welded pipe connection comprises a first steel pipe end and a second steel pipe end making a butt connection, a backup ring inserted into the steel pipe near the abutting ends to bridge the butt connection, and welding seams are provided at the ends of the backup ring for connecting the backup ring solidly to each of the two pipes.

In a further aspect of the invention a first steel pipe end and a second steel pipe end can make a butt connection, a lap collar can surround the two steel pipe ends to bridge the butt connection, and a welding seam is provided at the butt connection from the inside to connect the two pipe ends to the lap collar.

There is further provided a method for joining of steel pipes by disposing the ends of two pipes such as to give a butt connection, bridging the butt connection on the inside by a backup ring and welding the ends of the backup ring to the inside of the respective steel pipe.

Alternatively, the steel pipes are joined by again disposing the ends of two steel pipes in a butt connection, bridging the butt connection on the outside of the pipe ends by a lap collar, and welding the ends of the steel pipe to the inside of the lap collar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The present invention can be embodied in accordance with the drawing as shown in the following.

DESCRIPTION OF INVENTION AND PREFERRED EMBODIMENTS

Figure 1:
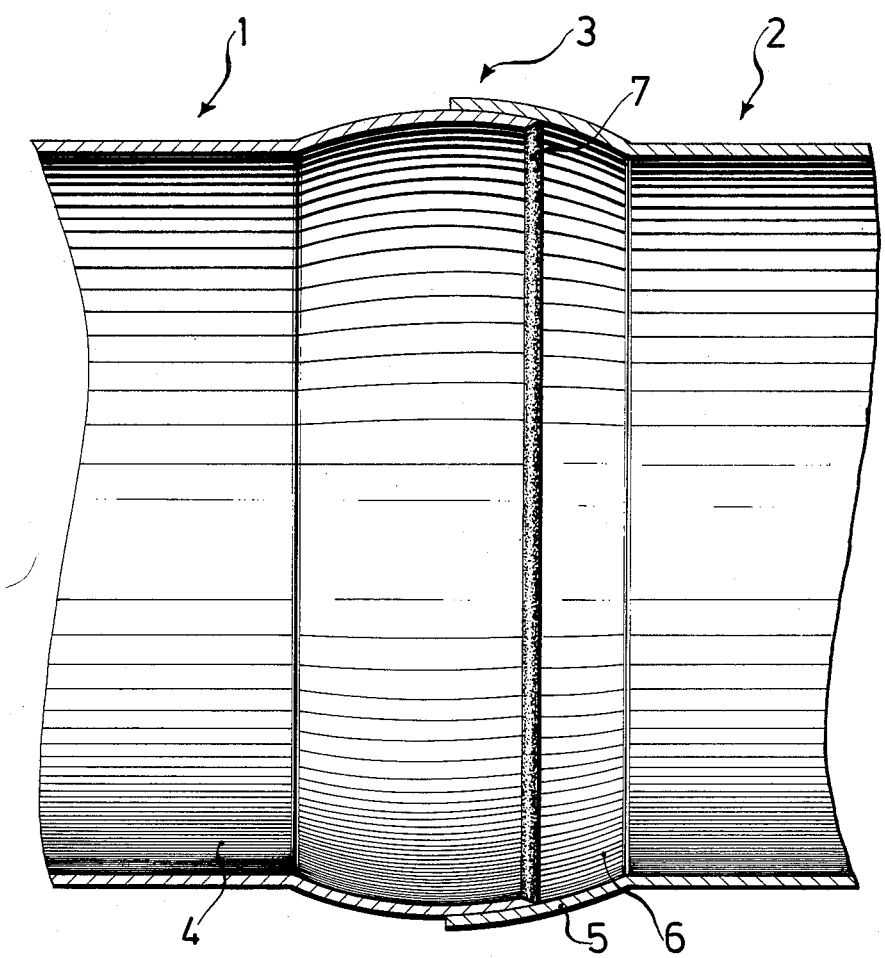
FIG. 1 is a sectional longitudinal view through a ball-type socket joint of two pipes according to the present invention.

In accordance with the present invention there is provided a method for connecting of steel pipes with socket and male pipe ends, which are connected with a circular fillet seam after the inserting and where the circular seam is welded from the inside. As is known from the butt welding technique for steel pipes the pipe ends can be automatically centered after being placed in an inserted position and they can then be automatically welded from the inside.

According to a preferred embodiment, spirally welded steel pipes (1, 2) having a diameter of 3,420 mm, a wall thickness of 19 mm and a 10° welding ball socket (3) are placed in a pipe trench, which however does not have any head holes, as is usual at a pipe line construction site. The male pipe end (4) of the steel pipe (1) is inserted into the welding ball socket (3) of the already placed pipe (2) by a suitable placing apparatus. A centering device is moved in the interior of the tube by a tube length to the connection point for automatically centering the two pipes and the front face (5) of the male pipe end (4) of the one steel pipe (1) is connected with the inner wall of the socket end (6) of the other steel pipe (2) by employing a commercial automatic gas metal arc welding device (GMAW). Preferably the automatic gas metal arc welding device is an automatic metal inert gas (MIG) welding device.

The diameter of the pipes can be from about 0.5 meter to 5 meter and preferably from about 1.6 meter to 5 meter. The thickness of the wall of the pipe can be from about 4 mm to 50 mm and preferably from about 8 mm to 30 mm. The ratio of the diameter of the ball to the outside diameter of the pipe can be from about 1.01 to 1.2 and preferably from about 1.01 to 1.1.

Figure 2:
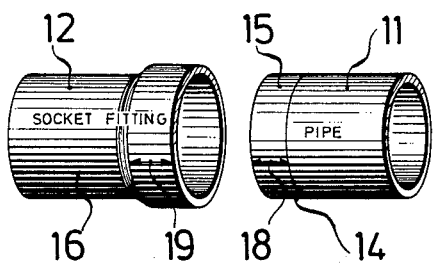
FIG. 2 is a perspective schematic view of two straight ends of pipes for providing a socket type connection.

Referring now to FIG. 2 there are shown two end sections 14 and 16 of two steel pipes 11 and 12, respectively. Pipe 16 is provided with a socket which extends over a length 19 and which is brought to overlap with a section of the other pipe of length 18. After the insertion, the end 15 of the pipe 11 is welded to preferably the bottom of the socket of pipe 12. It is advantageous if the inside diameter of the socket matches closely the outer diameter of pipe 12. Alternatively, one pipe can be provided with a narrowing end, which forms the male end and which is inserted into a regualar piece of pipe. Again, the male end is welded from the inside to the inner wall of the other pipe.

Figure 3:
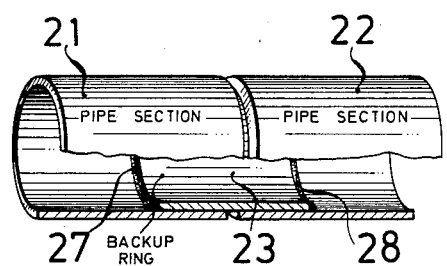
FIG. 3 is a partly perspective and in part sectional view of the joining of two pipes employing a backup ring according to the present invention.

In FIG. 3 there are shown two abutting pipe sections 21 and 22. A backup ring 23 is inserted into the pipe ends to form a bridge for the butt area. The backup ring is welded to the inside of the pipes thereby forming fillet weld seams 27 and 28.

Figure 4:
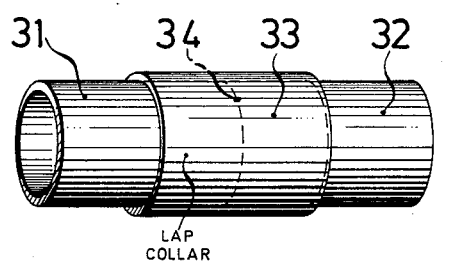
FIG. 4 is a perspective view of the joining of two pipe ends employing a lap collar in accordance to the present invention.

FIG. 4 shows two abutting pipe sections 31 and 32 contacting along a line 34. A lap collar 33 bridges over the circle where the ends of the two pipes meet. The ends of the pipes 31 and 32 are welded at the abutting circle 34 to each other and to the lap collar from the inside.

It will be understood that each of the elements described above, or two or more together, may also find a useful application in other types of joining operation and pipe connecting procedures differing from the types described above.

While the invention has been illustrated and described as embodied in the context of steel pipes welded from the inside, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for varoius applications without omitting features that, from the standpoint of prior art, fairly constitute essential characteristics of the generic or specific aspects of this invention.

What is claimed as new and desired to be protected by Letters Patent is set forth in the appended claims.

1. A method for the joining of the ends of straight steel pipes having male ball and female socket ends comprising:

forming the male end into a ball shaped section and the female end into socket shaped section;

inserting the pipe with the male ball end, which is provided as a ball section immediately adjoining a straight pipe section, into the pipe with the female socket end, which is provided as a ball-shaped socket immediately adjoining a straight pipe section;

moving a centering device into the interior of the tube to be joined;

automatically centering the male ball end of the inner pipe in the female socket end of the outer pipe by said centering device; and automatically welding a circular seam disposed at the inside of the female socket end and at the rim of the male ball end as the only weld connection between the female pipe and the male pipe for solidly connecting the pipe with the male ball end to the pipe with the female socket end.

2. The method according to claim 1 wherein the welding is performed by an automatic gas metal arc welding device.

3. The method according to claim 1 wherein the pipe diameter is from about 0.5 to 5 meter.

4. The method according to claim 1 wherein the diameter of the ball is from about 1.01 to 1.2 times the diameter of the pipe.

5. The pipe connection according to claim 1 wherein the pipe diameter is from about 0.5 to 5 meter and wherein the diameter of the ball is from about 1.01 to 1.2 times the diameter of the pipe.

* * * * *